United States Patent [19]

Shimizu

[11] Patent Number: 4,629,952
[45] Date of Patent: Dec. 16, 1986

[54] DRIVING CONTROL METHOD AND CIRCUIT FOR ELECTROMAGNETIC SERVO DEVICES

[75] Inventor: Yasuo Shimizu, Tochigi, Japan

[73] Assignee: Honda Giken Kogyo Kabushiki Kaisha, Tokyo, Japan

[21] Appl. No.: 764,703

[22] Filed: Aug. 12, 1985

[30] Foreign Application Priority Data

Aug. 16, 1984 [JP] Japan .................. 59-170812

[51] Int. Cl.⁴ .................................. G05B 11/10
[52] U.S. Cl. ..................... 318/432; 318/489; 318/624; 180/6.28; 180/6.44
[58] Field of Search ............... 318/432, 433, 488, 624, 318/489, 572, 580; 180/79.1, 141, 142, 143, 6.28, 6.44, 6.5; 244/192

[56] References Cited

U.S. PATENT DOCUMENTS

| | | | |
|---|---|---|---|
| 2,754,465 | 7/1956 | Brier ................................ | 318/488 |
| 3,571,686 | 3/1971 | Henegar ........................... | 318/624 |
| 4,530,413 | 7/1985 | Buike et al. ..................... | 180/79.1 |
| 4,556,116 | 12/1985 | O'Neil ............................. | 180/79.1 |

FOREIGN PATENT DOCUMENTS

| | | | |
|---|---|---|---|
| 52-35035 | 3/1977 | Japan ............................... | 180/79.1 |
| 55-76760 | 6/1980 | Japan ............................... | 180/79.1 |

Primary Examiner—William M. Shoop, Jr.
Assistant Examiner—Bentsu Ro
Attorney, Agent, or Firm—Armstrong, Nikaido, Marmelstein & Kubovcik

[57] ABSTRACT

A driving control method for an electromagnetic servo device including a driving control circuit adapted to generate a torque magnitude signal and a torque direction signal on the basis of an output signal from a torque detection mechanism for detecting torque acting on an input shaft in relation to an output shaft and to send an armature current, of such a magnitude and of such a polarity as desirous in accordance with the torque magnitude and direction signals to an electric motor for additionally providing auxiliary torque for the output shaft, comprises a step of setting the width of a dead zone of the torque magnitude signal wider than that of a dead zone of the torque direction signal. An electromagnetic servo device including a driving control circuit adapted to generate a torque magnitude signal and a torque direction signal on the basis of an output signal from a torque detection mechanism for detecting torque acting on an input shaft in relation to an output shaft and to send a driving current, of such a magnitude and of such a polarity as desirous in accordance with the torque magnitude and direction signals, to an electric motor for additionally providing auxiliary torque for the output shaft, is improved in that the driving control circuit comprises a dead zone control mechanism for setting the width of a dead zone of the torque magnitude signal wider than that of a dead zone of the torque direction signal.

12 Claims, 12 Drawing Figures

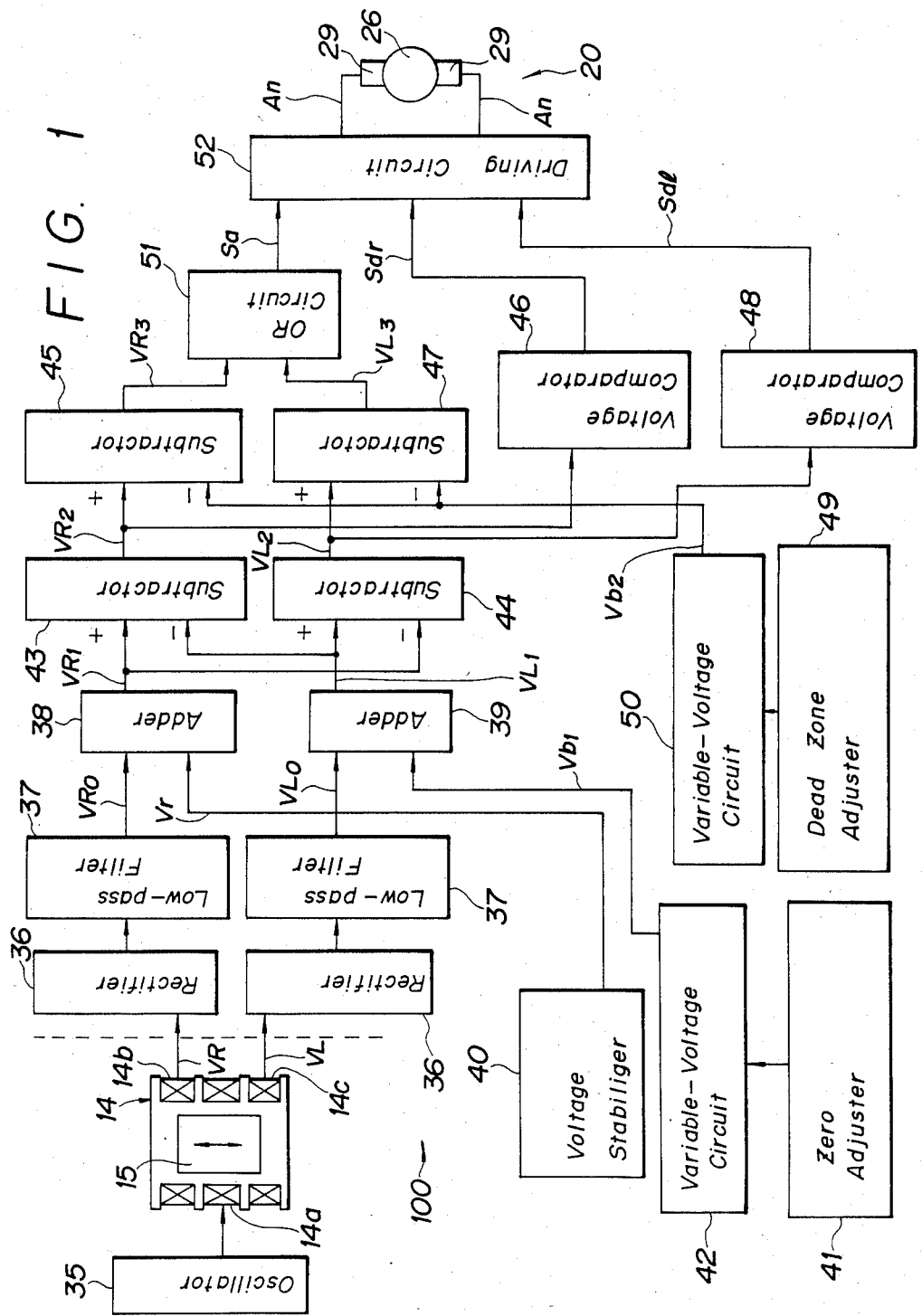

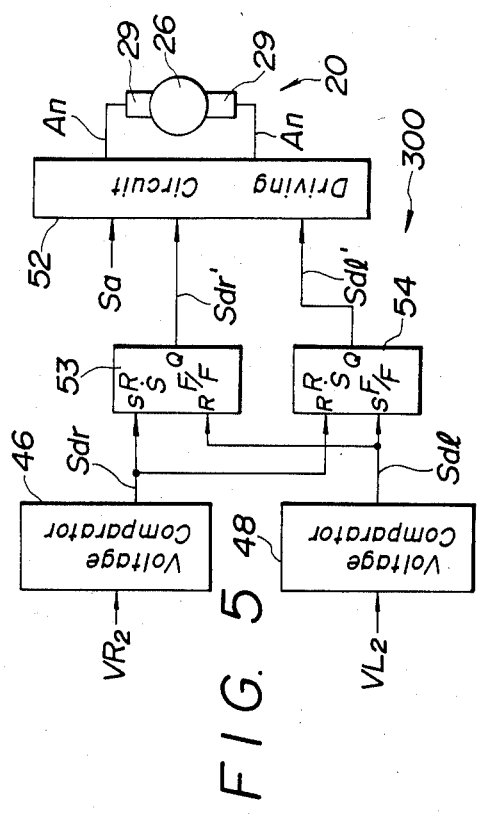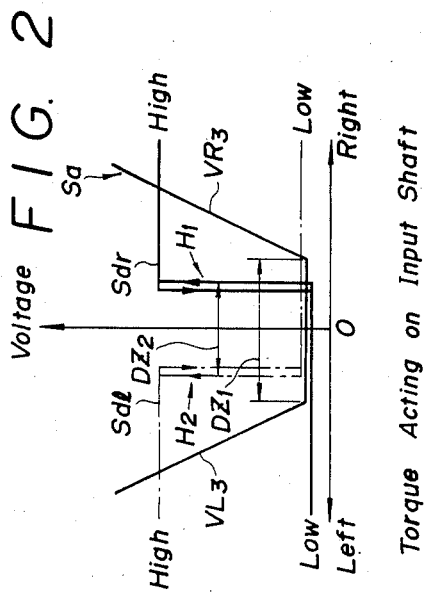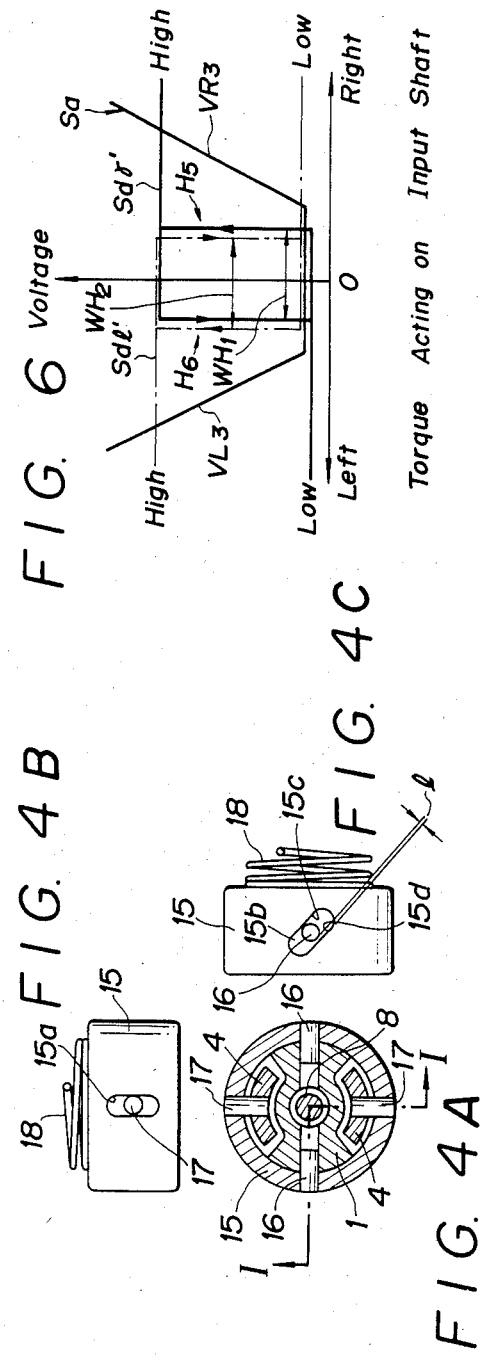

DRIVING CONTROL METHOD AND CIRCUIT FOR ELECTROMAGNETIC SERVO DEVICES

BACKGROUND OF THE INVENTION

1. Field of the Invention

The present invention generally relates to a driving control method and circuit for electromagnetic servo devices. More particularly, the invention relates to a driving control method and circuit for an electromagnetic servo device adapted to be employed in an electric type power steering system for vehicles.

2. Description of Relevant Art

In view of problems on the hydraulic type power steering system such as that the structure thereof was complicated, recent years have proposed a variety of electric type power steering systems for vehicles.

In those electric type power steering systems were employed various types of electromagnetic servo device.

Those types of electromagnetic servo device included an input shaft adapted to be connected to a steering wheel, an output shaft adapted to be connected, through a steering gearbox or otherwise, to a tie rod of a road wheel to be steered, a torque detection mechanism for detecting the magnitude as well as the direction of torque developed at the input shaft due to a steering force acting on the steering wheel in relation to a load at the end of the tie rod, an electric motor for supplying the output shaft with auxiliary torque, and a driving control circuit for sending to the electric motor an electric current of such a magnitude and in such a direction as necessary in accordance with a detection signal from the torque detection mechanism.

As an example thereof, there has been disclosed an electromagnetic servo device in Japanese Patent Lay-Open Print No. 59-70257, laid open on Apr. 20, 1984.

In this electromagnetic servo device, as a torque detection mechanism, a strain gauge sensor was disposed on an input shaft and, on the basis of an output signal from the sensor, there were generated a torque direction signal representing the direction of torque acting on the input shaft and a torque magnitude signal representing the magnitude of the torque in terms of an absolute value, to send to an electric motor an electric current of such a magnitude and in such a direction as necessary in accordance with the respective signals, so that an output shaft was supplied with necessary auxiliary torque.

Incidentally, as shown in FIG. 7A, in those electromagnetic servo devices in which, as shown in FIG. 7A, a circuit for generating a torque magnitude signal Sa had an inherent dead zone DZ in a torque region where the magnitude of torque acting on an input shaft was in the vicinity of zero, there conventionally was a problem such that an electric motor was unable to start when a steering wheel was rotated with a small steering force.

In view of this problem, in the electromagnetic servo device according to the aforesaid Japanese Patent Lay-Open Print, as shown in FIG. 7B, the torque magnitude signal, Sa, was biassed by a voltage $\Delta V$ in only such a region that constituted a dead zone DZ in the generation thereof. As a result, the electric motor was always permitted to be controlled in its driving with an electric current of adequate magnitude even while the torque acting on the input shaft was small.

However, as will be detailed later with reference to FIGS. 8 and 9, in this electromagnetic servo device, in which the torque direction signal (Sd) was generated in accordance with a torque detection signal substantially of the same form as the torque magnitude signal (Sa) shown in FIG. 7A, in a torque region where the signal state of the direction signal (Sd) had to be changed from "on" to "off", that is, from "high" to "low" or vice versa, the electric motor as to become fed with no electric current just at the time when the state of the signal (Sd) was changed from "on" to "off" and become fed with an electric current of a certain magnitude just when this signal state was changed from "off" to "on", so that a hunting was likely to occur in such torque region. In other words, in this servo device, in a torque region where the torque acting on the input shaft was small, the state of the torque direction signal (Sd) was to be interchanged between "on" and "off" from time to time, resulting in the tendency to cause hunting.

FIG. 8 is a graph showing a relation between a torque direction signal Sd and a torque magnitude signal Sa in a conventional type of electromagnetic servo device covering the electromagnetic servo device according to the aforesaid Japanese Patent Lay-Open Print.

In this conventional type of electromagnetic servo device, for generating the torque direction signal Sd depending on a detection signal from a torque detection mechanism, there was employed a voltage comparison circuit such as a Schmidt trigger circuit, which generally has a hysteresis characteristic.

In FIG. 8, the axis of abscissa represents the magnitude and direction of torque acting on an input shaft, the abscissa corresponding at the right side of the origin O to clockwise rotation of a steering wheel and at the left side of same to counterclockwise rotation of the steering wheel, and the axis of ordinate represents the value of respective voltages defining the torque magnitude and direction signals Sa, Sd.

As shown in FIG. 8, when plotted, the torque magnitude signal Sa, the voltage of which was correspondent to the magnitude of the input torque and by which the absolute value of the armature current of an electric motor was controlled to be dependent thereon, gave a valley-like characteristic curve having at the bottom thereof a dead zone DZa, and the torque direction signal Sd, which consisted of a pair of signals $Sd_1$, $Sd_2$ responsible either at $Sd_1$ for the clockwise rotation of the steering wheel and the other at $Sd_2$ for the counterclockwise rotation of same and depending on which the conduction of the armature current of the electric motor was controlled in the direction (polarity) thereof to be in accordance with the rotational direction of the input torque, gave a pair of stepped characteristic curves representing the clockwise rotation signal $Sd_1$ and the counterclockwise rotation signal $Sd_2$, respectively, the stepped curves cooperating with each other to define a dead zone DZd therebetween, while having shown at the phase of stepping such a hysterestic nature as represented by right and left hysteresis loops $H_1$ and $H_2$. The respective signals Sa and Sd ($Sd_1$, $Sd_2$) were fed to a driving control circuit of the electric motor.

In this conventional type of electromagnetic servo device, in which actually the torque direction signal Sd consisting of the signals $Sd_1$ and $Sd_2$ was generated at the aforementioned voltage comparison circuit on the basis of the torque magnitude signal Sa, the dead zone DZd in the generation of the direction signal Sd was set wider than the dead zone DZa in that of the magnitude signal Sa.

Incidentally, in FIG. 8, the signals $Sd_1$, $Sd_2$ have minimum values thereof shown as though they had been above zero for the convenience of distinction thereof, whereas these minimum values were all substantially zero.

FIG. 9 is a graph showing, for various magnitudes in both rotational directions of the input torque, the armature current of the electric motor, Am, as it was when the signals Sa, $Sd_1$, $Sd_2$ were varied as shown in FIG. 8. In FIG. 9 also, the armature current Am has a minimum value thereof shown as if it had been apparently above zero for easier comprehension, whereas this value was close to zero.

As shown in FIG. 9, the armature current Am had a hysterestic nature that was represented by right and left hysteresis loops $H_3$, $H_4$ due to the right and left hysteresis loops $H_1$, $H_2$ of the rotational direction signals $Sd_1$, $Sd_2$, respectively, as well as a dead zone corresponding to the dead zones DZa, DZd of the torque magnitude and direction signals Sa, Sd. Due to presence of the dead zone, in a region where the torque acting on the input shaft was within a small magnitude, the armature current Am had a "high" level range and a "low" level state inconsistent from each other though very close to each other. The hysterestic nature was such that the magnitude of the armature current Am experienced in each direction on the conduction thereof a sudden rise from the "low" state to a "high" level $A_1$ at a value of magnitude $T_1$ (for clockwise direction) or $T_2$ (for counterclockwise direction) of the input torque, as it was in the direction of increasing from zero, and a sudden fall from another "high" level $A_2$ lower than the level $A_1$ to the "low" state at another value of magnitude $T_3$ (for clockwise direction) or $T_4$ (for counterclockwise direction) of the input torque, as it was in the direction of decreasing to zero.

In this respect, the hysterestic width to be defined as the deviation between the rise and fall points $T_1$, $T_3$ (for clockwise direction) as well as that between the rise and fall points $T_2$, $T_4$ (for counterclockwise direction) was so small that, when the electric motor was turned "on" from "off" state thereof with rotation of the input shaft in either direction, auxiliary torque was excessively applied to the output shaft, thereby cancelling the phase delay that the output shaft had relative to the input shaft, thus reducing the level of the detection signal from the torque detection mechanism. Therefore, the armature current Am was then returned to the "low" level, which in turn gave rise to an enlarged phase difference between the input and output shafts, again turning "on" the electric motor. As a result, when the steering wheel was operated, in the region in which the torque acting on the input shaft was small, the electric motor alternately repeated "on" and "off", entering a hunting state.

The present invention has been achieved to effectively solve such problems in a conventional type of electromagnetic servo device, and particularly, of an electromagnetic servo device for electric type power steering systems for vehicles.

SUMMARY OF THE INVENTION

According to the present invention, there is provided a driving control method for an electromagnetic servo device (200) including an input shaft (1), an output shaft (4), an electric motor (20) for providing the output shaft (4) with auxiliary torque, a torque detection means (13) for detecting input torque acting on the input shaft (1), and a driving control circuit (100; 300) for generating a torque magnitude signal (Sa) and a torque direction signal (Sdr, Sdl; Sdr', Sdl') on the basis of an output signal (VR, VL; $VR_2$, $VL_2$) from the torque detection means (13) to send to the electric motor (20) a driving current (An) of such a magnitude and in such a direction (polarity) as desirous in accordance with both the torque magnitude signal (Sa) and the torque direction signal (Sdr, Sdl; Sdr', Sdl'), comprising a step of having the width of a dead zone ($DZ_1$) of the torque magnitude signal (Sa) set wider than that of a dead zone ($DZ_2$) of the torque direction signal (Sdr, Sdl; Sdr', Sdl').

Accordingly, an object of the present invention is to provide a driving control method for an electromagnetic servo device, which is able, even when input torque acting on an input shaft of the servo device is small, to effectively prevent the servo device from hunting, thereby assuring the device exhibits a force magnifying function thereof in a stable manner.

Further, according to the present invention, there is provided, in an electromagnetic servo device (200) including an input shaft (1), an output shaft (4), an electric motor (20) for providing the output shaft (4) with auxiliary torque, a torque detection means (13) for detecting input torque acting on the input shaft (1), and a driving control circuit (100; 300) for generating a torque magnitude signal (Sa) and a torque direction signal (Sdr, Sdl; Sdr', Sdl') on the basis of an output signal (VR, VL; $VR_2$, $VL_2$) from the torque detection means (13) to send to the electric motor (20) a driving current (An) of such a magnitude and in such a direction (polarity) as desirous in accordance with both the torque magnitude signal (Sa) and the torque direction signal (Sdr, Sdl; Sdr', Sdl'), an improvement comprising the driving control circuit (100, 300) having a dead zone control means (45, 47, 49, 50) for setting the width of a dead zone ($DZ_1$) of the torque magnitude signal (Sa) wider than that of a dead zone ($DZ_2$) of the torque direction signal (Sdr, Sdl; Sdr', Sdl').

Accordingly, another object of the present invention is to provide an electromagnetic servo device, which is able, even when input torque acting on an input shaft of the servo device is small, to be effectively prevented from hunting, thus being assured of exhibiting a force magnifying function thereof in a stable manner.

The above and further features, objects and advantages of the present invention will more fully appear from the following detailed description of a preferred embodiment of the invention when the same is read in conjunction with the accompanying drawings.

BRIEF DESCRIPTION OF THE DRAWINGS

In the drawings:

FIG. 1 is a block diagram of a driving control circuit for an electromagnetic servo device accordance to the present invention;

FIG. 2 is a graph showing characteristic curves of the driving control circuit of FIG. 1;

FIG. 4A is a sectional view for showing an essential part of a torque detection mechanism of the electromagnetic servo device, along line 4A-4A of FIG. 3;

FIGS. 4B and 4C are top and side views of a torque detecting mobile member in the torque detection mechanism of FIG. 4A, respectively;

FIG. 5 is a block diagram of an essential part of a driving control circuit according to a partial modification of the driving control circuit of FIG. 1;

FIG. 6 is a graph showing characteristic curves of the driving control circuit of FIG. 5;

DETAILED DESCRIPTION OF THE PREFERRED EMBODIMENT

Figure 3:
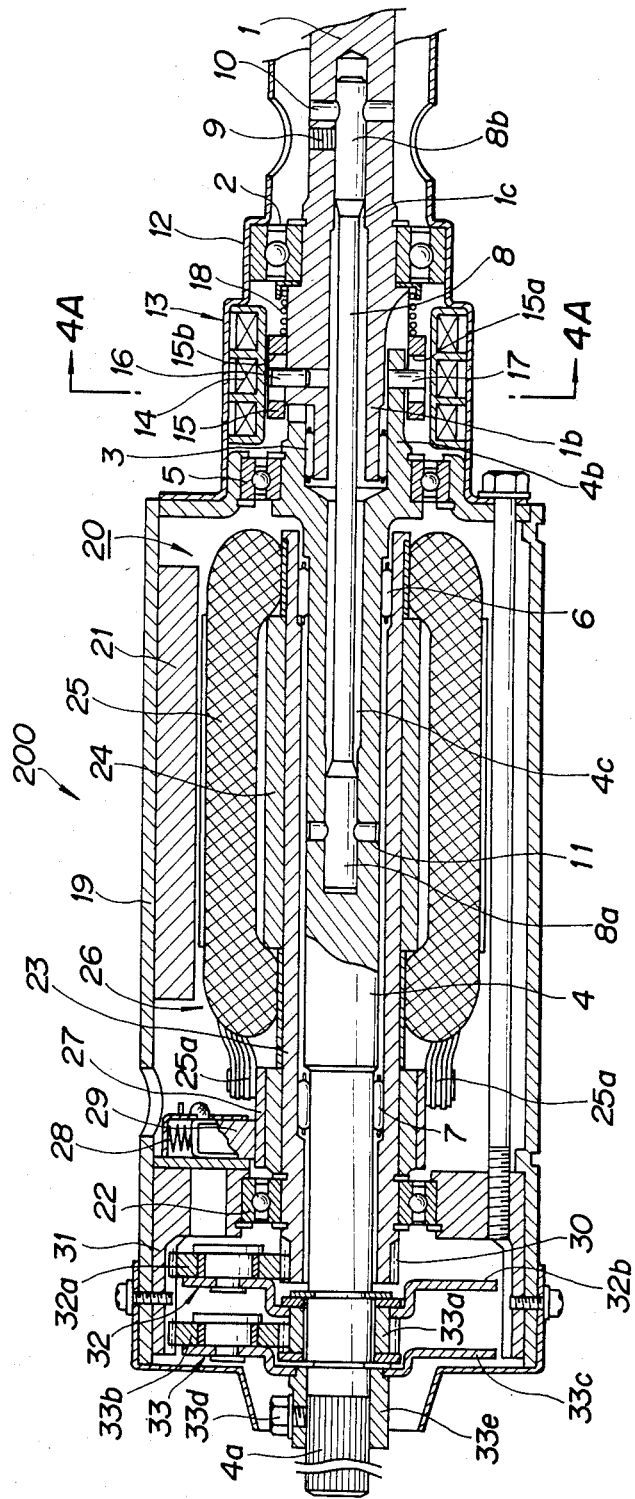
FIG. 3 is a longitudinal sectional view of the electromagnetic servo device adapted to be controlled by the driving control circuit of FIG. 1.
Figure 7A:
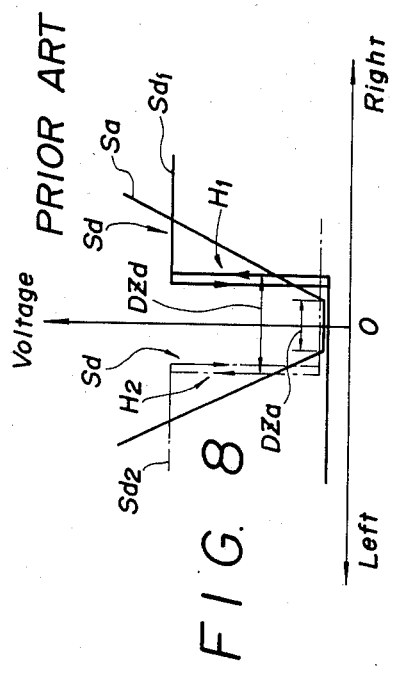
FIGS. 7A and 7B are graphs showing a characteristic curve of a torque magnitude signal Sa according to a prior art admitted in the Japanese Patent Lay-Open Print No. 59-70257 and an improved characteristic curve of a similar signal in this Japanese Patent Lay-Open Print, respectively.
Figure 7B:
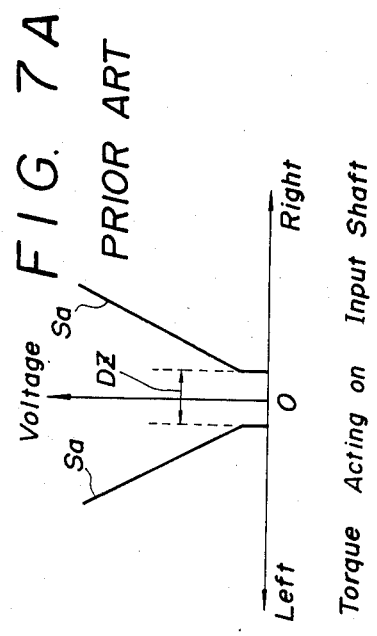

With reference to FIG. 1, designated at reference numeral 100 is the entirety of a driving control circuit for an electromagnetic servo device, according to the preferred embodiment of the present invention.

In FIG. 2, there are shown characteristic curves of the driving control circuit 100.

FIGS. 3 and 4A to 4C are sectional views of the whole and essential parts of an electromagnetic servo unit as the electromagnetic servo device, designated by reference numeral 200, to be controlled by the driving control circuit 100, respectively. The electromagnetic servo unit 200 has been originally developed by the present applicant.

For the aid of comprehension, there will be first described the structure of the electromagnetic servo device 200 with reference to FIGS. 3 and 4A to 4C, before the structure as well as function of the driving control circuit 100.

Shown in FIG. 3 is a sectional view as described, and more particularly, a quarter cutaway longitudinal sectional view of the electromagnetic servo unit 200, which is adapted to be employed in an electric type power steering system for vehicles.

The servo unit 200 includes an input shaft 1 rotatably supported by a ball bearing 2 and a needle bearing 3 and connected at the axially outer end thereof to a steering wheel (not shown) of the power steering system, and an output shaft 4 arranged coaxial with the input shaft 1 and interconnected by a torsion bar 8 with the input shaft 1. Also the output shaft 4 is rotatably supported by a ball bearing 5 and needle bearings 6, 7. The output shaft 4 has at the axially outer end thereof a splined portion 4a operatively assembled into a steering gearbox (not shown) of the power steering system. As later detailed, a uniquely formed axially inner end portion 1b of the input shaft 1 is engaged at the innermost end thereof into a uniquely formed axially inner end portion 4b of the output shaft 4, with the needle bearing 3 interposed therebetween.

The input and output shafts 1, 4 are fixed to the torsion bar 8 in a below described manner.

First, one end part 8a of the torsion bar 8 is inserted into an axial hollow 4c of the output shaft 4, and drilled at a proper position thereof from outside of the output shaft 4, to push into the drilled hole a spring pin 11 for fixing purpose. Then, after fitting necessary component parts on and around the input shaft 1, the other end part 8b of the torsion bar 8 is inserted into an axial hollow 1c of the input shaft 1, and the input shaft 1 is rotated to establish a proper angular position thereof relative to the output shaft 4, where it is fixed to the torsion bar 8 in a provisional manner. This provisional fixing of the input shaft 1 to the torsion bar 8 is effected with a fixing screw (not shown) screwed into a screw hole 9 formed in the input shaft 1 at a proper position thereof corresponding to the end part 8b of the torsion bar 8. Again, the torsion bar 8 is drilled from outside of the input shaft 1 as provisionally fixed thereto, to push into the drilled through hole another spring pin 10 for a regular fixing therebetween. Thereafter, the provisional fixing screw is removed.

In the foregoing arrangement, steering torque from the steering wheel is applied to the input shaft 1, and transmitted therefrom through the torsion bar 8 to the output shaft, causing torsional deformations in the torsion bar 8.

Incidentally, in FIG. 3, designated at reference numeral 12 is a steering column surrounding to accommodate therein the input shaft 1.

The servo unit 200 has, at an axial position thereof where the inner end portion 1b of the input shaft 1 is engaged into the inner end portion 4b of the output shaft 4, a torque detection mechanism 13 arranged so as to extend therearound and adapted for detecting torque acting on the input shaft 1 as differential torque between torque developed at the input shaft 1 such as due to the steering torque applied thereto and torque developed at the output shaft 4 such as due to the torque transferred thereto from the input shaft 1 through the torsion bar 8. The detection mechanism 13 comprises a differential transformer 14 fixed on the inner circumference of the steering column 12, and a tubular mobile member 15 axially slidably fitted on the mutually engaged end portions 1b, 4b of the input and output shafts 1, 4. The differential transformer 14 has a pair of output terminals connected to a later described driving control circuit 100 (FIG. 1), which has a function of determining the magnitude and the direction of conduction (i.e., polarity) of a driving current to be sent in the form of an armature current to a later described electric motor 20, to thereby control the motor 20 for the magnitude and the acting direction of auxiliary torque to be additionally applied therefrom to the output shaft 4.

As shown in FIG. 4A, the mobile member 15 is engaged with the input shaft 1 on one hand by means of a pair of radial pins 16, 16 radially outwardly projecting from the axially inner end portion 1b of the input shaft 1, and with the output shaft 4 on the other hand by means of another pair of radial pins 17, 17 radially outwardly projecting from the axially inner end portion 4b of the output shaft 4, the radial pins 17, 17 being each respectively angularly spaced apart at 90° from one of the radial pins 16, 16, so that the pins 16, 17 are disposed at quarter points in the circumferential direction. For the engagement with the radial pins 17, 17 projecting from the second shaft 4, the mobile meber 15 has a pair of engagement holes 15a formed therethrough at corresponding angular positions so as to elongate in the axial direction of the torsion bar 8. Also, for engagement with the radial pins 16, 16, the mobile member 15 is formed therethrough with a pair of engagement holes 15b at correspondng angular positions so as to elongate at a skewed angle with respect to the axial direction of the torsion bar 8. The mobile member 15 is normally biassed in the axial direction, to the left in FIG. 3, with a coil spring 18 compressed to be interposed between this member 15 and the aforesaid ball bearing 2. Between each of the radial pins 16 and corresponding one of the elongate holes 15b is provided a clearance 1 due to the precision of workmanship, which however is effectively eliminated by the presence of the spring 18 that normally urges the pin 16 into abutment with one side 15c of the hole 15b, while the other side 15d thereof has a play left relative to the pin 16.

In the foregoing arrangement, when the input shaft 1 is forced to rotate transmitting torque through the torsion bar 8 to the output shaft 4, there is developed a phase difference or relative angular displacement between the input and output shafts 1, 4, causing the mobile member 15 to axially move, to the right or left in FIG. 3, in accordance with the sign and absolute value of the phase difference, that is, the direction and magnitude of the relative angular displacement. In this respect, the differential transformer 14 is permitted to detect the torque acting on the input shaft 1, by potentiometrically measuring the axial displacement of the mobile member 15, which displacement is correspondent in the direction and proportional in the magnitude to such torque.

As shown in FIG. 3, the servo unit 200 includes a casing 19 accommodating therein the aforesaid electric motor 20 coaxially arranged around the output shaft 4. The electric motor 20 is constituted with a pair of permanent magnets 21 as field magnets fixed to the inner circumference of the casing 19, and a rotor 26 as an armature consisting of a tubular shaft 23 rotatably supported by a pair of needle bearings 6, 7 and a ball bearing 22, and an armature core 24 fixed on the tubular shaft 23 and provided with an armature winding 25 arranged so as to cut, when rotated, those lines of magnetic flux developed by the magnets 21. Further, the rotor 26 is provided at the left end thereof with a slip ring commutator 27, to which the armature winding 25 has terminals 25a thereof connected to permit an electric current of such a magnitude to be sent therethrough in such a direction of conduction (i.e., polarity) as circumstances require. At each of necessary electrical angular positions, a brush 29 is brought into abutment with the slip ring commutator 27, while being normally urged thereagainst with a coil spring 28. Through the brush 29, the controlled driving current is sent as an armature current from the driving control circuit 100 into the armature winding 25. More particularly, when the torque acting on the input shaft 1, as it is applied with the steering torque, is detected by the torque detection mechanism 13, the driving control circuit 100 functions in a later described manner to send a controlled driving current through the brush 29 into the armature winding 25, thereby driving the electric motor 20, so that the rotor 26 is forced to rotate around the output shaft 4, independently thereof, in the same rotating direction as the input shaft 1.

The rotation of the rotor 26 is transmitted to the output shaft 4, being reduced in the speed while increased in the torque, through first and second stages 32, 33 of planetary gearing connected in series to each other. The planetary gearing of the first stage 32 consists of a sun gear 30 formed along the outer circumference of the left end part of the tubular shaft 23, a ring gear 31 formed along the inner circumference of the casing 19, and a trio of planet gears 32a engaged with the sun and ring gears 30, 31. The planet gears 32a are rotatably supported by a disc-like flange 32b, which flange 32b is fixed to another sun gear 33a rotatably fitted on the output shaft 4. The planetary gearing of the second stage 33 consists of the sun gear 33a, the ring gear 31, and a trio of planet gears 33b engaged with the sun and ring gears 33a, 31. The planet gears 33b are rotatably supported by a disc-like flange 33c formed to be integral with a tubular member 33e, which member 33e is splined-fitted on the spline portion 4a of the output shaft 4 and further fixed through a radial bolt 33d to the same shaft 4.

Accordingly, when the steering torque is applied to the input shaft 1, the output shaft 4 receives, in addition to the torque transmitted from the input shaft 1 through the torsion bar 8, the torque developed by electromagnetic actions of the electric motor 20 arranged around the output shaft 4 and transmitted through the planetary gearings 32, 33. As a result, in the servo unit 200, torque applied to the input shaft 1 is apparently magnified when transmitted to be developed as output torque at the output shaft 4, and therefore the servo unit 200 is permitted to function as an electromagnetic force magnifying device for electric type power steering systems.

There will be described below the constitution as well as the function of the driving control circuit 100 adapted to control the driving current of the electric motor 20.

With reference to FIG. 1, the differential transformer 14 has a primary winding 14a thereof fed with an alternating electric current signal of a predetermined frequency from an oscillator 35, and a pair of secondary windings 14b, 14c adapted to provide a pair of voltage outputs VR, VL responsible either at VR for clockwise rotation of torque acting on the input shaft 1 and the other at VL for counterclockwise rotation thereof. The outputs VR, VL are first rectified through a pair of rectifiers 36, 36 and deprived of ripples by a pair of low-pass filters 37, 37, to be supplied as a pair of smoothed voltage signals VRo, VLo to a pair of adders 38, 39, respectively.

The differential transformer 14 is connected such that, when the mobile member 15 is caused to move upwardly in FIG. 1, the voltage of the signal VRo as well as of the signal VR rises and that of the signal VLo as well as of the signal VL falls in proportion to the upward displacement of the member 15, and to the contrary, when the member 15 is caused to downwardly move in FIG. 1, the former falls and the latter rises in proportion to the downward displacement of same.

In this respect, in the case where, notwithstanding the presence of clockwise torque applied to the input shaft 1, the output shaft 4 is kept from rotating clockwise in accord with the input shaft 1, the mobile member 15 is caused to move rightwardly in FIG. 4C, that is, upwardly in FIG. 4B, as described before. Incidentally, with respect to the mobile member 15, the vertical direction in FIG. 1 is coincident with that in FIG. 4B.

At the adder 38, the voltage of the signal VRo is added to that of a reference voltage signal Vr supplied from a voltage stabilizer 40. On the other hand, at the adder 39, the voltage of the signal VLo is added to that of a voltage signal $Vb_1$ supplied from a varible-voltage circuit 42 controlled with a zero adjuster 41. The adders 38, 39 have output voltage signals $VR_1$, $VL_1$ input to a pair of subtractors 43, 44, respectively.

The subtractors 43, 44 are adapted to output voltage signals $VR_2$, $VL_2$, respectively, such that $VR_2=Ai(VR_1-VL_1)$ and $VL_2=Ai(VL_1-VR_1)$, where Ai is an amplification factor.

In the control circuit 100, in which a single power supply (not shown) of positive polarity is used, even under a condition such that $VR_1<VL_1$ for example, the signal $VR_2$ output from the subtractor 43 has a voltage thereof kept from becoming negative, while under such condition it approaches zero at the positive side. Such characteristic is analogous to the voltage signal $VL_2$ of the subtractor 44, as well.

In the foregoing circuit arrangement, at the adder 39, the input signal VLo is biassed by the voltage signal $Vb_1$, to thereby control the voltage of the output signal $VL_1$ of the adder 39 to be balanced with that of the output signal $VR_1$ of the adder 38 when no torque is applied to the input shaft 1. For this purpose, the zero adjuster 41 is calibrated without torque applied to the input shaft 1. Consequently, the output signals $VR_2$, $VL_2$ of the subtractors 43, 44 have voltages thereof adjusted to be both substantially zero when the shaft 1 is applied with no torque.

In this respect, the subtractors 43, 44 are provided as of a first stage for the following reasons: In the servo unit 200, due to possible mechanical errors such as in the machining the fabrication of the torque detection mechanism 13, the mobile member 15 is not always permitted to be disposed at a magnetically neutral point of the differential transformer 14. As a result, the adders 38, 39, voltage stabilizer 40, zero adjuster 41, and voltage circuit 42 may cooperate together to adjust the voltages of the output signals $VR_1$, $VL_1$ of the adders 38, 39, such that $VR_1=VL_1$, under the condition that no torque is applied to the input shaft 1. Thus, even under such condition, it may so happen that $VR_1=VL_1=k>0$ (zero), which, if left as it may be, would constitute inadequacy for subsequent processes.

Incidentally, the voltage stabilizer 40 and the variable-voltage circuit 42 are constituted in such a manner that the output voltage of a constant-voltage power supply (not shown) is divided, for the former, by means of a dividing resistor (not shown) and, for the latter, by means of a constant resistor and a variable resistor (not shown).

It will be apparent that, instead of the adders 38, 39, there may be employed a pair of subtractors for zero adjustment of the voltage signals $VR_2$, $VL_2$.

Further, with reference to FIG. 1, the voltage signal $VR_2$ output from the subtractor 43 is input to a subtractor 45 and a voltage comparator 46 of a hysterestic nature, while the voltage signal $VL_2$ from the subtractor 44 is input to another subtractor 47 and another voltage comparator 48 of a hysterestic nature. The subtractors 45, 47 are further fed with a bias-oriented voltage signal $Vb_2$ output from a variable-voltage circuit 50 controlled with a dead zone adjuster 49, so that voltage signals $VR_3$, $VL_3$ output from the subtractors 45, 47 are reduced in the voltage by that of the signal $Vb_2$ from the levels of the signals $VR_2$, $VL_2$, respectively, thereby increasing the width of a dead zone $DZ_1$ in the below described signal generation by those signals $VR_3$, $VL_3$. The signals $VR_3$, $VL_3$ are input to an analogue OR circuit 51, which generates a torque magnitude signal Sa.

FIG. 2 includes a characteristic curve of the torque magnitude signal Sa which is a combination of the voltage signals $VR_3$ and $VL_3$. In FIG. 2, the dead zone $DZ_1$ in the generation of the signal Sa is given in an enlarged form.

The voltage comparator 46 receiving the signal $VR_2$ from the subtractor 43 is adapted to generate a torque direction signal Sdr, which is a voltage signal set at a "high" level when the voltage of the input signal $VR_2$ is higher than a predetermined value $Vr_1$ and at a "low" level when the above voltage is lower than another predetermined value $Vr_2$, where the values $Vr_1$, $Vr_2$ are set such that $0<Vr_2<Vr_1$. The torque direction signal Sdr shows a hysteresis when it changes from the "high" level to the "low" level and vice versa. This hysteresis is intentionally provided to prevent the voltage comparator 46 from chattering in the vicinity of working voltages thereof, that is, near the voltages $Vr_1$, $Vr_2$. The torque direction signal Sdr has the "high" level when the mobile member 15 is caused to move upwardly in FIG. 1 exceeding a predetermined magnitude of displacement, thus implying that the input shaft 1 is clockwise rotated with respect to the output shaft 4.

The voltage comparator 48 receiving the signal $VL_2$ from the subtractor 45 is adapted to generate another torque direction signal Sdl which implies that the input shaft 1 is counterclockwise rotated with respect to the output shaft 4. This comparator 48 is analogous in the constitution to the above comparator 46. As a result, the torque direction signal Sdl is symmetrical to the above-described torque direction signal Sdr, and it will not be further described herein.

Figure 8:
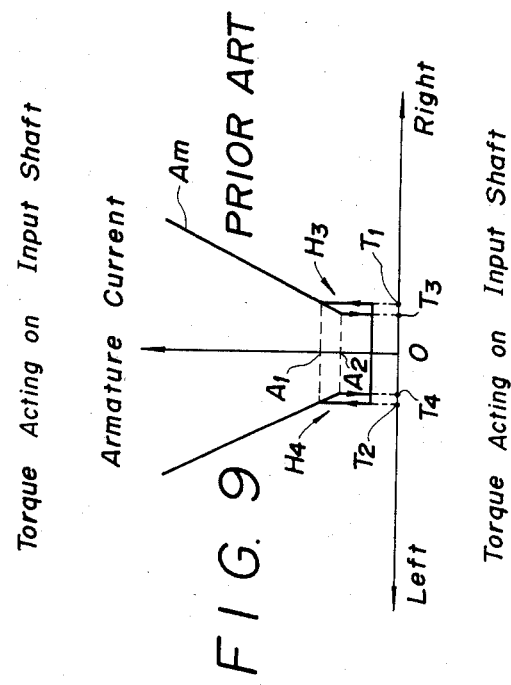
FIG. 8 is a graph of characteristic curves showing relations between torque and voltages in a driving circuit of a conventional electromagnetic servo device.

It will be easily comprehended that the relation which the voltage signals $VR_2$, $VL_2$ have to the torque direction signals Sdr, Sdl in FIG. 1 is analogous to the relation which the torque magnitude signals Sa has to the torque direction signals Sd consisting of the rotational direction signals $Sd_1$, $Sd_2$ in FIG. 8.

FIG. 2 further includes a pair of characteristic curves representing the torque direction signals Sdr, Sdl output from the voltage comparators 46, 48, respectively. Like in FIGS. 8 and 9, the respective signals Sa, Sdr, Sdl have minimum values thereof substantially equal to zero volts.

The torque magnitude signal Sa and the torque direction signals Sdr, Sdl are all input to a driving circuit 52 of the electric motor 20, which circuit 52 is connected to a proper power supply (not shown). The driving circuit 52 is adapted to send to the electric motor 20 an armature current An of a required magnitude and in a required direction (porlarity) in accordance with those signals Sa, Sdr, Sdl, to thereby drive the motor 20, in such a manner that:

(1) when both the torque direction signals Sdr, Sdl are at "low" level, no current is sent to the motor 20;

(2) when the direction signal Sdr is at "high" level while the direction signal Sdl is at "low" level, the armature current An is sent to the motor 20 at a magnitude of amperage proportional to the voltage of the torque magnitude signal Sa, in such a direction of conduction (polarity) that causes clockwise rotation of the rotor 26 of the motor 20; and (3) when the signal Sdr is at "low" level while the signal Sdl is at "high" level, the armature current An is sent to the motor 20 at a magnitude proportional to the voltage of the torque magnitude signal Sa, in such a direction that causes counterclockwise rotation of the rotor 26.

In the driving control circuit 100, as shown in FIG. 2, the dead zone $DZ_1$ in generation of the torque magnitude signal Sa has a width set wider than that of a dead zone $DZ_2$ in generation of the torque direction signals Sdr, Sdl. Therefore, after a phase in which no torque is applied to the input shaft 1, when torque acting thereon is detected, first the voltage comparator 46 or 48 functions to determine the rotational direction of the rotor 26 of the motor 20, then the armature current An is sent to the brush 29 at a magnitude of amperage proportional to the voltage of the torque magnitude signal Sa. As will be apparent, the current An is gradually increased from a level substantially equal to zero ampere.

To the contrary, in the case where torque acting on the input shaft 1 experiences reduction of the magnitude from a relatively large value substantially to zero, also the armature current An being sent to the brush 29 is to gradually decrease in the magnitude of amperage to zero in accordance with the torque magnitude signal Sa, before the torque direction signals Sdr or Sdl determining the direction of rotation of the rotor 26 goes down to "low" level.

Accordingly, when the input shaft 1 is rotated clockwise or counterclockwise, the current An sent from the driving circuit 52 to the brush 29 substantially follows the characteristic curve of the torque magnitude signal Sa shown in FIG. 2, since the dead zone $DZ_1$ for the signal Sa is set wider than the dead zone $DZ_2$ for the signals Sdr, Sdl by cooperation of the subtractors 45, 47, dead zone adjuster 49, and variable-voltage circuit 50.

Figure 9:
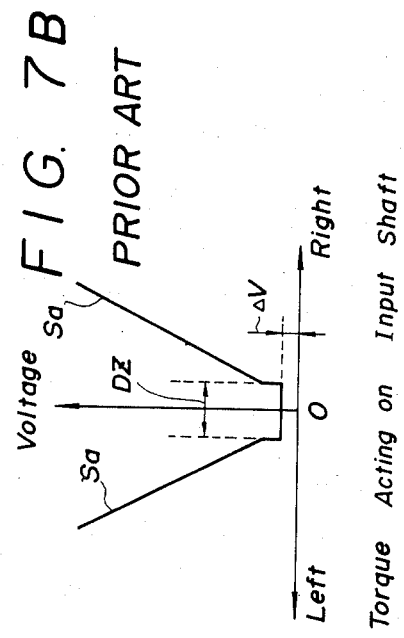
FIG. 9 is a graph of a characteristic curve showing a relation between the torque and an armature current determined, based on the above voltages, to be sent to an electric motor of the electromagnetic servo device of FIG. 8.

Therefore, in the electromagnetic servo unit 200 having the driving control circuit 100 shown in FIGS. 1 to 4, then differently from the armature current Am in FIG. 9, the driving current An to the electric motor 20 is effectively prevented against such a sudden increase of magnitude to a relatively high level that otherwise would be experienced when the motor 20 is turned from "off" state to "on" state, as well as against such a sudden decrease thereof substantially to a zero level that otherwise would be experienced when the motor 20 is turned "off" from "on" state. As a result, even in a torque region where torque acting on the input shaft 1 is small, the servo unit 200 is favorably prevented from hunting, thus assuring firm and stable achievement of smooth force-magnifying function.

FIG. 5 shows an essential part of a driving control circuit 300 according to a partially modified example of the driving control circuit 100 shown in FIG. 1. Like parts are designated by like reference numerals.

In this partial modification, a pair of flip-flop circuits 53, 54 of an R-S type known as a memory circuit are employed to interface a pair of voltage comparators 46, 48 with a driving circuit 52, respectively. Other circuit elements are analogous to those of FIG. 1 and are omitted from FIG. 5.

A torque direction signal Sdr output from the voltage comparator 46 is input as a trigger signal to a set terminal S of one flip-flop circuit 53 and a reset terminal R of the other flip-flop circuit 54, and another torque direction signal Sdl output from the voltage comparator 48, is input as another trigger signal to a reset terminal R of the former 53 and a set terminal S of the latter 54. Then, a phase-delayed torque direction signal Sdr' from an output terminal Q of the flip-flop circuit 53 and another phase-delayed torque direction signal Sdl' from an output terminal Q of the flip-flop circuit 54 are input to the driving circuit 52.

According to the above partial modification, each time when the output signal Sdr of the voltage comparator 46 rises from "low" to "high" level, the output signal Sdr' from the flip-flop circuit 53 and that output signal Sdl' of the flip-flop circuit 54 have the signal states thereof changed from "low" to "high" and from "high" to "low", respectively; and each time when the output signal Sdl of the voltage comparator 48 rises from "low" to "high" level, the signal Sdr' from the circuit 53 changes from "high" to "low" and the signal Sdl' from the circuit 54 changes from "high" to "low".

FIG. 6 shows respective characteristic curves of the torque direction signals Sdr', Sdl' and a torque magnitude signal Sa in this partial modification.

As shown in FIG. 6, when plotted, the torque direction signals Sdr', Sdl' draw a pair of hysteresis loops $H_5$, $H_6$ having widths $WH_1$, $WH_2$ wider than those of hystersis loops $H_1$, $H_2$ given by the torque direction signals Sdr, Sdl in FIG. 2, respectively.

Incidentally, similarly to FIG. 2, the signals Sdr', Sdl', Sa in FIG. 6 have minimum values thereof all substantially equal to zero volts. Moreover, the hysteresis loops $H_5$, $H_6$ are shown in FIG. 6 as if they were deviated from each other for easier comprehension, while they overlap each other along the widths $WH_1$, $WH_2$, as will be understood from the function of the flip-flop circuits 53, 54.

According to the modified example shown in FIGS. 5 and 6, as well as in the embodiment shown in FIGS. 1 to 4, even in a torque region where torque acting on an input shaft 1 is small, an electromagnetic servo unit 200 is effectively prevented from hunting, thus assuring smooth and stable achievement of a force magnifying function. In addition thereto, the torque direction signals Sdr', Sdl' have the hysteresis loops $H_5$, $H_6$ set wide by the loop widths $WH_1$, $WH_2$, so that, when the input shaft 1 is once caused to start rotation, the torque direction signals Sdr' or Sdl' will not be changed from "high" or "low" level unless a driver intentionally tries rotating the input shaft 1 in the reverse direction. Therefore, a driving current An correspondent to the torque magnitude signal Sa is assured to be sent in a further stabilized manner through a brush 29 into a rotor 26 of an electric motor 20.

In the foregoing embodiment of the invention, the respective driving control circuits 100, 300 may advantageously be constituted with a microcomputer system.

Moreover, it will be easily understood that the present invention is applicable also to an electromagnetic servo device in which a torque direction signal Sd has no hysterestic nature.

In the foregoing embodiment, the voltage signals $VR_2$, $VL_2$ from the subtractors 43, 44 are obtained by zero adjusting the output signals VR, VL of the torque detection mechanism 13, using the adders 38, 39, voltage stabilizer 40, zero adjuster 41, and variable-voltage circuit 42 cooperating therefor with the elements 43. 44. In this respect, in an application using a strain gauge sensor as a torque detection means, a detection signal from such sensor may preferably be fed, instead of the above signals $VR_2$, $VL_2$, directly to the subtractors 45, 47 and the voltage comparators 46, 48.

The distinctive feature of the present invention resides in that the dead zone $DZ_1$ in generation of the torque magnitude signal Sa is set wider than the dead zone $DZ_2$ in that of the torque direction signals Sdr, Sdl. It will be apparent that the circuit constitution capable of substantiation of such feature is not limited to the described ones.

Although there has been described what is at present considered to be the preferred embodiment of the invention, it will be understood that the present invention may be embodied in other specific forms without departing from the spirit or essential characteristics thereof. The present embodiment is therefore to be considered in all respects as illustrative and not restrective. The scope of the invention is indicative by the appended claims rather than by the foregoing description.

I claim:

1. A driving control method for an electromagnetic servo device (200) including:
   an input shaft (1);
   an output shaft (4);
   an electric motor (20) for providing said output shaft (4) with auxiliary torque;
   torque detection means (13) for detecting input torque acting on said input shaft (1); and
   a driving control circuit (100; 300) for generating a torque magnitude signal (Sa) and a torque direction signal (Sdr, Sdl; Sdr', Sdl') on the basis of an output signal (VR, VL; VR$_2$, VL$_2$) from said torque detection means (13) to send to said electric motor (20) a driving current (An) of such a magnitude and of such a polarity as desirous in accordance with both said torque magnitude signal (Sa) and said torque direction signal (Sdr, Sdl; Sdr', Sdl'),
   comprising:
   a step of having the width of a dead zone (DZ$_1$) of said torque magnitude signal (Sa) set wider than that of a dead zone (DZ$_2$) of said torque direction signal (Sdr, Sdl; Sdr', Sdl').

2. A driving control method according to claim 1, wherein:
   said width setting step comprises a step of adding a bias signal (Vb$_2$) to said output signal (VR$_2$, VL$_2$) of said torque detection means (13).

3. A driving control method according to claim 2, wherein:
   said width setting step further comprises, before adding said bias signal (Vb$_2$) to said output signal (VR$_2$, VL$_2$) of said torque detection means (13), a step of adjusting the value of said bias signal (Vb$_2$).

4. A driving control method according to claim 2, wherein:
   said width setting step further comprises, before adding said bias signal (Vb$_2$) to said output signal (VR$_2$, VL$_2$) of said torque detection means (13), a step of zero adjusting a torque detection signal (VR, VL) output from said torque detection means (13).

5. A driving control method according to claim 1, further comprising:
   a step of generating said torque direction signal (Sdr, Sdl) from said output signal (VR$_2$, VL$_2$) of said torque detection means (13), using a voltage comparator (46, 48).

6. A driving control method according to claim 1, further comprising:
   a step of generating said torque direction signal (Sdr', Sdl') from said output signal (VR$_2$, VL$_2$) of said torque detection means (13), using a voltage comparator (46, 48) and a status memory circuit (53, 54).

7. In an electromagnetic servo device (200) including:
   an input shaft (1);
   an output shaft (4);
   an electric motor (20) for providing said output shaft (4) with auxiliary torque;
   torque detection means (13) for detecting input torque acting on said input shaft (1); and
   a driving control circuit (100; 300) for generating a torque magnitude signal (Sa) and a torque direction signal (Sdr, Sdl; Sdr', Sdl') on the basis of an output signal (VR, VL; VR$_2$, VL$_2$) from said torque detection means (13) to send to said electric motor (20) a driving current (An) of such a magnitude and of such a polarity as desirous in accordance with both said torque magnitude signal (Sa) and said torque direction signal (Sdr, Sdl; Sdr', Sdl'),
   an improvement comprising:
   said driving control circuit (100, 300) having dead zone control means (45, 47, 49, 50) for setting the width of a dead zone (DZ$_1$) of said torque magnitude signal (Sa) wider than that of a dead zone (DZ$_2$) of said torque direction signal (Sdr, Sdl; Sdr', Sdl').

8. An electromagnetic servo device according to claim 7, wherein:
   said dead zone control means (45, 47, 49, 50) comprises bias addition means (45, 47, 49, 50) for adding a bias signal (Vb$_2$) to said output signal (VR$_2$, VL$_2$) of said torque detection means (13).

9. An electromagnetic servo device according to claim 8, wherein:
   said bias addition means (45, 47, 49, 50) comprises bias adjust means (49, 50) for adjusting the value of said bias signal (Vb$_2$).

10. An electromagnetic servo device according to claim 8, wherein:
    said driving control circuit (100, 300) further comprises zero adjust means (38, 39, 40, 41, 42, 43, 44) for zero adjusting a torque detection signal (VR, VL) output from said torque detection means (13), before the stage of adding said bias signal (Vb$_2$) to said output signal (VR$_2$, VL$_2$) of said torque detection means (13).

11. An electromagnetic servo device according to claim 7, wherein:
    said driving control circuit (100) further comprises a voltage comparator (46, 48) for generating said torque direction signal (Sdr, Sdl) from said output signal (VR$_2$, VL$_2$) of said torque detection means (13).

12. An electromagnetic servo device according to claim 7, wherein;
    said driving control circuit (300) further comprises a voltage comparator (46, 48) and a status memory circuit (53, 54) cooperating with each other for generating said torque direction signal (Sdr', Sdl') from said output signal (VR$_2$, VL$_2$) of said torque detection means (13).

* * * * *